United States Patent [19]

Rowles et al.

[11] 4,270,939

[45] Jun. 2, 1981

[54] SEPARATION OF HYDROGEN CONTAINING GAS MIXTURES

[75] Inventors: Howard C. Rowles, Center Valley; Donald W. Woodward, New Tripoli, both of Pa.

[73] Assignee: Air Products and Chemicals, Inc., Allentown, Pa.

[21] Appl. No.: 64,232

[22] Filed: Aug. 6, 1979

[51] Int. Cl.³ ............................................. F25J 3/02
[52] U.S. Cl. ......................................... 62/22; 62/39; 62/27
[58] Field of Search ........................... 62/23–28, 62/22

[56] References Cited

U.S. PATENT DOCUMENTS

| | | | |
|---|---|---|---|
| 3,407,146 | 10/1968 | Becker et al. | 62/28 |
| 3,568,458 | 3/1971 | Hoffman | 62/31 |
| 3,568,459 | 3/1971 | Hoffman | 62/34 |
| 3,649,558 | 3/1972 | Linde et al. | 62/28 |
| 3,675,434 | 7/1972 | Crawford et al. | 62/28 |
| 4,002,042 | 1/1977 | Pryor et al. | 62/28 |
| 4,102,659 | 7/1978 | Martin | 62/28 |

Primary Examiner—Norman Yudkoff
Attorney, Agent, or Firm—Richard A. Dannells, Jr.; E. Eugene Innis

[57] ABSTRACT

Enhanced recovery of the methane content of a multi-component stream containing lower boiling gas components is obtained by effecting condensation of at least the major portion of the methane content in a dephlegmator wherein separated lower boiling components are employed as indirect heat exchange refrigerants.

8 Claims, 2 Drawing Figures

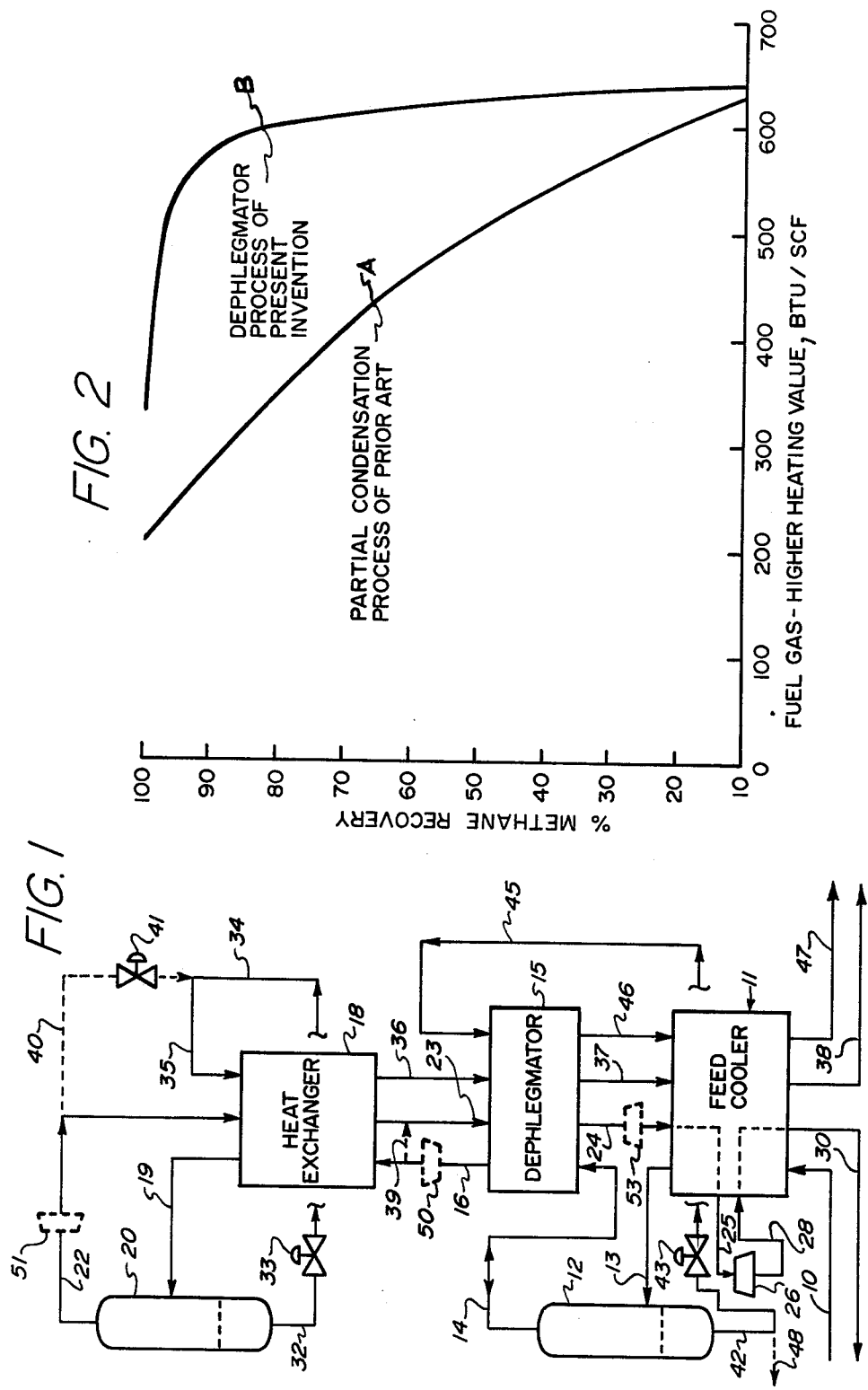

SEPARATION OF HYDROGEN CONTAINING GAS MIXTURES

The present invention relates to systems for separation of one or more selected components from a multicomponent gas mixture and is more particularly concerned with recovery of valuable components from such multicomponent gas mixtures derived as off gas in industrial processes.

BACKGROUND OF THE INVENTION

The hydrogen-rich gas mixtures recovered from ammonia plant purge, as well as other hydrogen-rich gases obtained as off gas in various industrial processes, typically contain methane accompanied by low-boiling inert gas such as nitrogen and/or argon. Such gas mixtures are generally burned to recover the fuel value of the combustible gases such as hydrogen and methane and that of higher hydrocarbons that may be present. In doing so, however, the higher feed stock value of the hydrogen is sacrificed. A process can be designed to recover a substantial part of the methane and to further upgrade the hydrogen, employing a conventional partial condensation process. A typical example of such proposed partial condensation system is that described in U.S. Pat. No. 3,675,434. In such a partial condensation process, however, only about 20% of the methane is recoverable at a higher heating value (HHV) on the order of 600 Btu/scf (5342 Kcal/m$^3$). By alternative design modifications using partial condensation techniques, up to about 82% of the methane content of the gas mixture can be recovered but only as a fuel gas product of quite lower heating value, such as that corresponding to the heating value of typical ammonia plant purge gas, which has a higher heating value on the order of about 330 Btu/scf (2938 Kcal/m$^3$ at 21° C.).

The composition of the ammonia plant purge gas will vary to a certain extent with the process conditions employed and the particular source or sources of the feed gas. In general, however, purge gas will contain, after pre-separation of ammonia therefrom, (in mole percent) about 60–70% hydrogen, about 20 to 30% nitrogen and argon, the remainder being mostly methane. Other hydrogen-rich gas mixtures derived from industrial processes such as in hydrogenation may include, in addition to methane and possibly some higher boiling hydrocarbons, a low boiling elemental gas such as nitrogen and/or argon, and also other gas boiling below methane such as carbon monoxide for example.

SUMMARY OF THE INVENTION

It has now been found that by replacing the partial methane condenser with a dephlegmator, in accordance with the present invention, greatly enhanced methane recovery is achieved. Thus, about 80% of the methane content of the feed gas can be recovered at higher heating values in the order of 600 Btu/scf (5342 Kcal/m$^3$) and over 99% of the methane can be recovered at higher heating values in the order of about 330 Btu/scf (2938 Kcal/m$^3$). Such enhanced recovery of methane results from the rectification taking place in the dephlegmator. Since less of the nitrogen and argon inerts and/or carbon monoxide are condensed in the dephlegmator system than in the case of systems employing partial condensers, the gaseous product recovered from the condensate is more concentrated in methane.

FIG. 1 of the accompanying drawings is a simplified schematic flow diagram of a separation and recovery system according to preferred embodiments of the invention; and FIG. 2 is a plotted graph showing the percent of attainable methane recovery at different higher heating values of the obtained fuel gas, when employing a system based on partial condensation as compared to a system employing a dephlegmator in accordance with the present invention.

DETAILED DESCRIPTION

The flow diagram of FIG. 1 depicts the process that may be employed as applied to a multicomponent gas mixture substantially free of more readily condensible or otherwise more readily separable components. Thus, in the case of purge gas from an ammonia synthesis plant, the ammonia present in the purge gas stream will have been previously removed by known methods of the art, such as by condensation and adsorption. A typical process for the initial removal of the ammonia from ammonia synthesis purge gas is described, for example in U.S. Pat. No. 3,675,434. The particular method adopted for removing ammonia from the gas to be charged to the system of the invention is not material to the practice of the present invention.

The multicomponent gas mixture charged to the system may be ammonia synthesis purge gas previously freed of ammonia, or an ammonia-free off gas from some other industrial process, or a mixture of gases from several of such sources. The gas mixture to be separated is admitted to the system through line 10 at its available temperature which may be ambient temperature or below and at super-atmospheric pressure of at least about 15 atmospheres. Assuming the charge gas to be wholly or partly ammonia synthesis purge gas from which the ammonia had been previously removed, it will be comprised chiefly of hydrogen and nitrogen, together with smaller quantities of methane and argon.

Through line 10 the multicomponent charge gas is introduced into feed cooler 11 wherein it is precooled to a temperature near the dew point of the feed or alternatively to a temperature sufficiently low to condense at least a part of its methane content at the prevailing pressure. While, for the purpose of simplifying the flow diagram, a single heat exchanger is depicted as constituting feed cooler 11, it will be understood that two or more such heat exchangers in series may be employed for progressive cooling of the charge gas. The resulting near saturated vapor or vapor-liquid mixture from 11 is passed through line 13 and is separated in separator 12. The overhead vapor fraction from separator 12 is introduced by line 14 into dephlegmator 15, wherein it is further cooled by heat exchange to condense most of the remaining methane and a part of the nitrogen and argon.

In the dephlegmator the vapor flows upwardly through a plurality of indirect heat exchange passages through which the refrigerants, hereinafter described, are passed at several levels. As the vapor stream introduced into the dephlegmator by line 14 is cooled, some of the mixture condenses on the walls of the passages forming a reflux liquid that flows downward. Thus, interaction takes place between the upwardly flowing gas stream and the downwardly flowing stream of cooler liquid. Rectification results, wherein the gaseous mixture discharged overhead from the dephlegmator 15 is enriched in hydrogen and the liquid leaving the dephlegmator through line 14 is enriched in methane and any possible other higher boiling components that were present in the gas stream introduced into the dephlegmator.

The liquid stream produced in the dephlegmator is withdrawn through line 14 at a temperature ordinarily below that of the vapor inlet temperature and introduced into separator 12. It will be noted that line 14 is the same line through which the vapor stream leaves separator 12, as indicated by the double-headed arrow on that line. In separator 12 the liquid from the dephlegmator is mixed with any liquid condensate which might be produced by the cooling in heat exchanger 11.

As shown in the flow diagram, the uncondensed vapor leaving the dephlegmator by overhead line 16, is introduced into a condensing zone comprising heat exchanger 18, for further cooling to a temperature effecting condensation of residual nitrogen and argon including any remaining vestigial gases of higher boiling point. The obtained vapor-liquid mixture from heat exchanger 18 is withdrawn by line 19 and introduced into separator 20.

From separator 20 the overhead gaseous stream is withdrawn by line 22 and returned to heat exchanger 18 for heat exchange with the warmer vapor stream introduced by line 16. The gas thus warmed by the heat exchange in 18 is then passed via line 23 into and through the dephlegmator 15 where it serves as one of the coolants. Leaving the dephlegmator by line 24, the gas is further employed as a coolant in feed cooler 11. As shown, the gas from line 24 leaving the upper level of the feed cooler 11 by line 25 is work expanded by turbine 26 with accompanying cooling. The work expanded gas, at its thus lowered temperature, is returned to a lower level of feed cooler 11 by line 28 for further use in cooling the feed gas from line 10, and is then discharged through line 30.

The gas discharged through line 30 is of high hydrogen purity, desirably of about 75% or higher hydrogen content, useful as ammonia synthesis gas or in hydrogenation processes. The recovered gas in line 30 is essentially free of methane and other hydrocarbons but contains small amounts of low boiling inert gases such as nitrogen and/or argon.

The liquid phase from separator 20, as shown, is discharged through line 32, and expanded through expansion valve 33 with consequent further reduction in temperature, and then passed by lines 34 and 35, through heat exchanger 18 where it serves as the principal coolant. Leaving heat exchanger 18, the product from line 35 is passed, in turn, via lines 36 and 37 respectively, through the dephlegmator 15 and feed cooler 11, to serve as coolant in these, and is discharged from feed cooler 11 by line 38. The discharged gas stream in line 38 is composed chiefly of low boiling inert gases such as nitrogen and argon, being substantially free of methane (generally less than 1%) and which may contain perhaps a small amount of unremoved hydrogen.

Recovery of a separate inert gas stream, via line 38, is optional. If a product of somewhat lower hydrogen purity than that obtained in line 30 by the above described procedure is deemed satisfactory, the heat exchanger 18 and separator 20 might be eliminated entirely. In this alternative, the uncondensed vapor from line 16 is passed through by-pass line 39 and line 23 to the dephlegmator.

If a product of higher hydrogen purity is desired to be recovered in line 30 (as up to 95% or higher hydrogen content), this may be accomplished by splitting off a part of the gas in line 22, as shown by dotted line 40 and expansion valve 41, and combining the split off portion with the stream entering heat exchanger 18 through line 35. In this way colder temperatures may be achieved in the heat exchanger 18 and consequently higher hydrogen purity in the separator 20.

The condensed methane-enriched liquid fraction is discharged from separator 12 through line 42, expanded as indicated through valve 43, and the thus cooled expanded product passed to an upper level of dephlegmator 15 by line 45 to serve as a coolant in the dephlegmator. Leaving the dephlegmator via line 46, the methane-enriched product is passed by line 46 into and through feed cooler 11, from which it is discharged by line 47 as a fuel product of high heating value. The fuel product generally will contain over 95% of the methane initially present in the feed gas which entered the cold box through line 10. Alternatively, the condensed methane-enriched liquid fraction may be withdrawn through line 48 without serving as a coolant in dephlegmator 15 and feed cooler 11.

If a fuel gas product of higher heating value is desired, this can be accomplished in accordance with the present invention by operation under selected conditions of pressure and temperature such that a smaller amount of the inert gases are carried over in the liquid fraction withdrawn from separator 12. In doing so, however, lower methane recovery is attained as seen from the graph in FIG. 2.

Referring to the graph in FIG. 2, curve A is that obtained by a partial condensation process, plotting the percent recovery of methane against the higher heating value (HHV) of the recovered fuel gas. Curve B is the corresponding curve obtained when employing the dephlegmator operation in accordance with the present invention. The compared curves are based on treatment of a gas feed at 270 psia composed of: 40 mole % hydrogen, 46.7% nitrogen, 3.4% argon and 9.9% methane. Comparing the two curves it will be seen that at a fuel gas HHV of 330 Btu/scf, only about 82% of the methane is recovered using partial condensation as compared to almost 100% recovery by the dephlegmator process. At a fuel gas HHV of 600 Btu/scf, only about 20% of the methane is recovered using partial condensation as compared to about 80% when using a dephlegmator.

An example of process conditions for practice of the invention is set out below for a charge gas comprising:

|  | mole % |
|---|---|
| hydrogen | 52 |
| nitrogen and argon | 43 |
| methane | 5 |

The gas mixture of the recited composition was obtained by mixing ammonia-freed purge gas with another hydrogen-rich off gas of lower hydrogen content.

The feed gas is introduced into heat exchanger 11 at 45° F. (280° K.) and at a pressure of 410 psia (28.27 bars). In heat exchanger 11 the feed gas is cooled to about minus 242° F. (121° K.) slightly above its dew point, and introduced through line 13 into separator 12 at an attained pressure of about 400 psia (27.58 bars). The gaseous overhead fraction from separator 12 is passed through line 14 to the dephlegmator 15, wherein it is further cooled by exchange with cooler process streams, to about minus 277° F. (101.5° K.). The methane-enriched product which condenses within the dephlegmator is returned to separator 12 through line 14.

The uncondensed vapor leaving the dephlegmator via line 16 contains less than 1% methane. It is passed through heat exchanger 18 wherein it is further cooled to about minus 293° F. (92.6° K.) thereby effecting condensation of nitrogen and argon therein. The obtained vapor-liquid mixture leaving heat exchanger 18 via line 19 is separated at 20. The overhead vapor fraction in line 22 is composed principally of hydrogen together with uncondensed nitrogen and argon.

The coolant streams employed for refrigeration in heat exchanger 18 includes the overhead vapor in line 22 as well as the liquid bottoms from separator 20. The latter, withdrawn from separator 20 by line 32, is expanded to about 32 psia (2.2 bars) through valve 33 resulting in further cooling the same to about minus 312° F. (82° K.) at which temperature and pressure it is passed via lines 34 and 35 through heat exchanger 18 in indirect heat exchange with the warmer stream passed through 18 via line 16. The coolants leaving heat exchanger 18 via lines 23 and 36 will each be at about minus 289° F. (95° K.) and these are further employed for cooling the warmer gas entering the dephlegmator via line 14. These coolant streams leave the dephlegmator via lines 24 and 37 at about minus 256° F. (113° K.).

Refrigeration in the dephlegmator is also obtained by use of the liquid fraction from separator 12. This fraction, leaving the separator by line 42, is expanded through valve 43 to 42 psia (2.9 bars) and is introduced as coolant in the dephlegmator via line 45 at about minus 295° F. (91.5° K.).

The initial cooling of the feed gas in heat exchanger(s) 11 is effected with several colder process streams. The hydrogen rich stream in line 24, which enters the upper part of heat exchanger 11 at minus 256° F. (113° K.) is warmed by such exchange to about minus 125° F. (186° K.). Leaving the upper part of the heat exchanger via line 25, this gas stream will be at a pressure of about 391 psia (27 bars). It is expanded in the turbine 26 to about 327 psia (22.5 bars) and thereby cooled to about minus 138° F. (179° K.) in which condition it is returned, via line 28, to a lower level of heat exchanger 11 for further indirect heat exchange, leaving the system via line 30 at about 36° F. (275° K.) and at a pressure of about 325 psia (22.4 bars). The hydrogen rich gas stream, discharged through line 30, which will contain about 76% by volume $H_2$ (97% hydrogen recovery) and the balance almost entirely composed of nitrogen and argon, may be returned as recycle gas to an ammonia synthesis system or may be utilized as a hydrogenation gas in other desired applications.

The coolant stream introduced into heat exchanger 11 by line 37, leaves that exchanger by line 38 as a vent gas at about 25 psia (1.72 bars). This vent gas will be composed of about 93% nitrogen and argon and will contain about 6% hydrogen, with less than 1% methane.

The coolant introduced into heat exchanger 11 via line 46, leaves the exchanger by line 47, at a pressure of about 38 psia (2.62 bars). In the operation of the present example, the obtained fuel gas is one having an HHV of 330 Btu/scf and comprises 32% methane, 64% nitrogen and argon, and about 4% hydrogen. The gas contains about 97% of the methane present in the feed gas charged through line 10.

While in the illustrated preferred embodiment, part of the cooling of the feed gas is supplied by work expansion of the returning hydrogen-enriched fraction, it is also within the scope of the invention to employ other known methods for furnishing the required levels of cooling for the desired separation of the different fractions. Thus, instead of work-expansion to lower fluid temperature, an external refrigerant might be employed to supply part of the required refrigeration for all or part of the feed gas. The refrigeration might also be introduced at colder temperature levels, such as into the uncondensed vapor leaving the dephlegmator in line 16 or the partially condensed vapor leaving the heat exchanger 18 in line 19. Work-expansion refrigeration might also be derived at other locations in the process, such as on the uncondensed vapor in line 16 through expander 50, or on the hydrogen-enriched gas in line 22 through expander 51, or in line 24 through expander 53.

In another embodiment of the present invention, a hydrogen-carbon monoxide gas mixture is separated to remove methane and also to adjust the hydrogen to carbon monoxide ratio to make a more suitable feed gas for methanol synthesis. Typical gasifier off-gases from coal and oil gasification processes comprise (in mole percent) about 40 to 60% hydrogen, 30 to 50% carbon monoxide, and 5 to 20% methane, after preseparation of other minor components such as carbon dioxide and water.

In the flow diagram of FIG. 1, the gasifier off-gas is processed in the same manner as that described above in connection with the ammonia synthesis purge gas. Methane is first condensed in the dephlegmator 15, separated in phase separator 12, and recovered via line 47 at a concentration of about 30 to 60% as desired, with the remainder being primarily carbon monoxide. If necessary, additional carbon monoxide can be condensed in the heat exchanger 18 to yield a 66% hydrogen, 33% carbon monoxide vapor overhead product in separator 20. This hydrogen enriched mixture, recovered via line 30, containing hydrogen and carbon monoxide in a 2 to 1 mole ratio, and containing only a trace of methane, is a desirable feed gas for methanol synthesis. Excess carbon monoxide, containing minor amounts of hydrogen and methane is recovered from the bottoms liquid of separator 20 via line 38.

What is claimed:

1. The method of separating a multicomponent hydrogen-containing feed gas mixture comprising methane and at least one low-boiling gas from the group consisting of nitrogen, argon and carbon monoxide which comprises:
   (a) introducing the feed gas mixture at superatmospheric pressure into a feed cooling zone in indirect heat exchange with cooler product stream(s),
   (b) precooling the feed gas mixture in said cooling zone to a temperature near its dew point or sufficient to condense a minor portion of said feed gas stream,
   (c) flowing the uncondensed portion of said gas upwardly through a number of passages in a dephlegmation zone in indirect heat exchange with refrigerant supplied to said passages, whereby said gas is caused to partially condense on the walls of said passages forming a reflux liquid, such that interaction takes place between the upwardly flowing gas stream and the stream of cooler downwardly flowing liquid condensate, whereby due to resulting rectification, said liquid is progressively enriched in methane, (d) withdrawing said liquid as a methane-enriched fuel gas product, (e) introducing the uncondensed vapor from said dephlegmation zone into a condensing zone wherein the uncondensed vapor is cooled to a temperature at least sufficient to condense a portion of said low-boiling gas present therein, (f) withdrawing from said condensing zone a mixed vapor-liquid stream, (g) separating said mixed vapor-liquid stream to provide a vapor portion comprising a hydrogen-rich stream and a liquid portion composed chiefly of gas from the group consisting of nitrogen, argon, carbon monoxide and mixtures thereof, (h) passing said separated vapor portion through said condensing and/or dephlegmation zones as additional coolant in heat exchange with the precooled feed gas passed upwardly through said zones, (i) discharging said additional coolant from said dephlegmation zone and passing the so discharged coolant through said feed cooling zone in indirect heat exchange with the warmer feed gas, (j) withdrawing the thus warmed coolant as a hydrogen-rich gas product essentially free of methane; and (k) employing the separated liquid portion from step (g) as refrigerant for cooling the uncondensed vapors introduced into said condensing zone from said dephlegmation zone.

2. The method as defined in claim 1 wherein the liquid portion from step (g) is expanded with consequent lowering the temperature thereof prior to its being returned to the condensing zone, and after serving as refrigerant in said condensing zone said liquid portion is passed in series through said dephlegmation zone and said feed cooling zone.

3. The method of separating a multicomponent hydrogen-containing feed gas mixture comprising methane and at least one low-boiling gas from the group consisting of nitrogen, argon, and carbon monoxide which comprises:

(a) introducing the feed gas mixture at superatmoshereic pressure into a feed cooling zone in indirect heat exchange with cooler product stream(s), (b) precooling the feed gas mixture in said cooling zone to a temperature near its dew point or sufficient to condense a minor portion of said feed gas stream, (c) flowing the uncondensed portion of said gas upwardly through a number of passages in a dephlegmation zone in indirect heat exchange with refrigerant supplied to said passages, whereby said gas is caused to partially condense on the walls of said passages forming a reflux liquid, such that interaction takes place between the upwardly flowing gas stream and the stream of cooler downwardly flowing liquid condensate, whereby due to resulting rectification, said liquid is progressively enriched in methane, (d) withdrawing said liquid as a methane-enriched fuel gas product;

(e) further cooling the uncondensed vapors from said dephlegmator zone, and (f) returning the cooled uncondensed vapors to said dephlegmation zone for use as a refrigerant therein.

4. The method as defined in claim 3 wherein the uncondensed vapor from said dephlegmation zone subjected to said further cooling is a hydrogen-rich gas mixture essentially free of methane and comprises a minor quantity of at least one gas from the group consisting of nitrogen, argon and carbon monoxide.

5. The method as defined in claim 4 wherein said further cooling of the hydrogen-rich gas mixture is effected in a condensing zone at a temperature sufficiently low to cause condensation of at least a portion of the argon, nitrogen and/or carbon monoxide present therein, and wherein following said further cooling and resulting condensation the condensed portion is expanded with consequent lowering of the temperature thereof and the thus expanded product employed for said further cooling of the hydrogen-rich gas mixture.

6. The method as defined in claim 3 wherein the further cooled uncondensed vapors after serving as refrigerant in said dephlegmation zone are passed through said feed cooling zone for cooling the feed gas by indirect heat exchange therewith.

7. The method as defined in claim 3 wherein said further cooled vapors after serving as refrigerant in said dephlegmation zone and after being used to cool the feed gas are discharged from said feed cooling zone and recovered as a hydrogen-rich gas at superatmospheric pressure containing at least 90% of the hydrogen content of the initial feed gas mixture charged to said feed cooling zone.

8. The method as defined in claim 3 wherein said further cooled uncondensed vapors from said dephlegmation zone are expanded to lower pressure with resulting lowering the temperature thereof, and the thus expanded gas returned to one of the feed cooling zones for additional cooling of feed gas by indirect heat exchange therewith.

* * * * *